United States Patent
Emura et al.

(10) Patent No.: US 9,248,885 B2
(45) Date of Patent: Feb. 2, 2016

(54) DERAILLEUR

(71) Applicant: SHIMANO INC., Sakai (JP)

(72) Inventors: Atsuhiro Emura, Sakai (JP); Kenkichi Inoue, Sakai (JP); Yoshikazu Sugiyama, Yao (JP)

(73) Assignee: SHIMANO INC., Sakai (JP)

( * ) Notice: Subject to any disclaimer, the term of this patent is extended or adjusted under 35 U.S.C. 154(b) by 79 days.

(21) Appl. No.: 14/042,583

(22) Filed: Sep. 30, 2013

(65) Prior Publication Data

US 2015/0094178 A1   Apr. 2, 2015

(51) Int. Cl.
*B62M 9/1242* (2010.01)
*B62M 9/125* (2010.01)
*B62M 9/1342* (2010.01)

(52) U.S. Cl.
CPC ............. *B62M 9/1242* (2013.01); *B62M 9/125* (2013.01); *B62M 9/1342* (2013.01)

(58) Field of Classification Search
CPC .. B62M 9/1242; B62M 9/126; B62M 9/1248; B62M 9/1342; B62M 9/127
USPC ....................................................... 474/80, 82
See application file for complete search history.

(56) References Cited

U.S. PATENT DOCUMENTS

| | | | | |
|---|---|---|---|---|
| 4,078,444 A * | 3/1978 | Huret | | 474/82 |
| 4,424,048 A * | 1/1984 | Shimano | | 474/82 |
| 4,516,961 A * | 5/1985 | Coue | | 474/80 |
| 4,586,913 A * | 5/1986 | Nagano | | 474/80 |
| 4,604,078 A * | 8/1986 | Nagano | | 474/80 |
| 4,756,704 A * | 7/1988 | Nagano | | 474/144 |
| 4,832,662 A * | 5/1989 | Nagano | | 474/80 |
| 5,037,355 A * | 8/1991 | Kobayashi | | 474/82 |
| 5,104,358 A * | 4/1992 | Kobayashi | | 474/82 |
| 5,312,301 A * | 5/1994 | Kobayashi | | 474/80 |
| 5,620,384 A * | 4/1997 | Kojima et al. | | 474/82 |
| 5,779,581 A * | 7/1998 | Fujii | | 474/82 |
| 6,093,122 A * | 7/2000 | McLaughlin et al. | | 474/82 |
| 6,099,425 A * | 8/2000 | Kondo | | 474/82 |
| 6,270,124 B1 * | 8/2001 | Nanko | | 285/15 |
| 6,629,903 B1 * | 10/2003 | Kondo | | 474/82 |
| 7,014,584 B2 * | 3/2006 | Nanko et al. | | 474/80 |
| 7,081,058 B2 * | 7/2006 | Nankou | | 474/80 |
| 7,331,890 B2 * | 2/2008 | Ichida et al. | | 474/80 |
| 7,651,424 B2 * | 1/2010 | Yamamoto et al. | | 474/82 |
| 7,704,173 B2 * | 4/2010 | Ichida et al. | | 474/82 |
| 7,722,486 B2 * | 5/2010 | Nanko | | 474/80 |
| 7,914,407 B2 * | 3/2011 | Fukushima et al. | | 474/82 |
| 8,029,396 B2 * | 10/2011 | Valle et al. | | 474/82 |
| 8,439,779 B2 * | 5/2013 | Florczyk | | 474/82 |
| 8,678,962 B2 * | 3/2014 | Jordan | | 474/80 |
| 8,678,963 B2 * | 3/2014 | Kuwayama et al. | | 474/80 |
| 8,777,788 B2 * | 7/2014 | Kawakami et al. | | 474/80 |
| 2002/0034996 A1* | 3/2002 | Valle | | 474/82 |
| 2003/0083161 A1* | 5/2003 | Ozaki | | 474/80 |

(Continued)

*Primary Examiner* — Henry Liu
(74) *Attorney, Agent, or Firm* — Mori & Ward, LLP

(57) ABSTRACT

A derailleur comprises a base member, a chain guide, a link member, and a shaft member. The base member is configured to be attached to a bicycle frame. The chain guide comprises a first member and a second member. The first member includes a first connecting portion. The second member includes a second connecting portion to overlap the first connecting portion. The link member is configured to movably couple the chain guide to the base member. The shaft member is configured to couple the first connecting portion to the second connecting portion and configured to rotatably couple the chain guide to the link member.

19 Claims, 13 Drawing Sheets

(56) References Cited

U.S. PATENT DOCUMENTS

| | | | |
|---|---|---|---|
| 2003/0100393 A1* | 5/2003 | Nanko | 474/80 |
| 2004/0110587 A1* | 6/2004 | Shahana et al. | 474/80 |
| 2006/0058133 A1* | 3/2006 | Tetsuka et al. | 474/80 |
| 2006/0189421 A1* | 8/2006 | Ichida et al. | 474/80 |
| 2006/0189422 A1* | 8/2006 | Ichida et al. | 474/80 |
| 2006/0194660 A1* | 8/2006 | Shahana | 474/82 |
| 2007/0178998 A1* | 8/2007 | Tetsuka | 474/80 |
| 2007/0184925 A1* | 8/2007 | Ichida et al. | 474/80 |
| 2007/0298920 A1* | 12/2007 | Nakai et al. | 474/80 |
| 2008/0182689 A1* | 7/2008 | Fujii et al. | 474/82 |
| 2011/0224037 A1* | 9/2011 | Auer et al. | 474/82 |
| 2013/0072333 A1* | 3/2013 | Kuwayama et al. | 474/82 |

\* cited by examiner

DERAILLEUR

BACKGROUND OF THE INVENTION

1. Field of the Invention

The present invention relates to a derailleur.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been recently redesigned is a derailleur. The derailleur laterally shifts a bicycle chain to change gears of the bicycle. A front derailleur and a rear derailleur are known as the derailleur.

SUMMARY OF THE INVENTION

In accordance with a first aspect of the present invention, a derailleur comprises a base member, a chain guide, a link member, and a shaft member. The base member is configured to be attached to a bicycle frame. The chain guide comprises a first member and a second member. The first member includes a first connecting portion. The second member includes a second connecting portion to overlap the first connecting portion. The link member is configured to movably couple the chain guide to the base member. The shaft member is configured to couple the first connecting portion to the second connecting portion and configured to rotatably couple the chain guide to the link member.

In accordance with a second aspect of the present invention, the derailleur according to the first aspect is configured so that the first member includes a first guide portion. The second member includes a second guide portion. The first connecting portion protrudes from the first guide portion. The second connecting portion protrudes from the second guide portion toward the first guide portion.

In accordance with a third aspect of the present invention, the derailleur according to the first aspect is configured so that the chain guide is configured to be movable with respect to the base member between a retracted position and an extended position at which the chain guide is farther from the base member than the retracted position. The shaft member is configured to move away from the base member in a forward direction of the bicycle frame when the chain guide moves from the retracted position to the extended position.

In accordance with a fourth aspect of the present invention, the derailleur according to the first aspect further comprises an additional link member configured to couple the chain guide to the base member such that the base member, the chain guide, the link member, and the additional link member define a four-bar linkage.

In accordance with a fifth aspect of the present invention, the derailleur according to the fourth aspect is configured so that the additional link member includes a cable attachment portion to which an operation cable is to be attached.

In accordance with a sixth aspect of the present invention, the derailleur according to the fifth aspect is configured so that the additional link member is arranged closer to the bicycle frame than the link member when the base member is attached to the bicycle frame.

In accordance with a seventh aspect of the present invention, the derailleur according to the first aspect is configured so that the first connecting portion and the second connecting portion are provided at an upper end portion of the chain guide.

In accordance with an eighth second aspect of the present invention, the derailleur according to the first aspect is configured so that the first connecting portion includes a first through-hole. The second connecting portion includes a second through-hole. The shaft member extends through the first through-hole and the second through-hole.

In accordance with a ninth aspect of the present invention, the derailleur according to the eighth aspect is configured so that the shaft member includes a first flange. The first connecting portion and the second connecting portion are provided between the first flange and the link member.

In accordance with a tenth aspect of the present invention, the derailleur according to the ninth aspect is configured so that the link member includes a first link through-hole through which the shaft member extends. The shaft member includes a second flange. The first connecting portion, the second connecting portion, and the link member are provided between the first flange and the second flange.

In accordance with an eleventh aspect of the present invention, the derailleur according to the ninth aspect is configured so that the shaft member includes a second flange and a third flange. The third flange is provided between the first flange and the second flange. The first connecting portion and the second connecting portion are provided between the first flange and the third flange.

In accordance with a twelfth aspect of the present invention, the derailleur according to the eleventh aspect is configured so that the link member includes a first link through-hole through which the shaft member extends. The link member is provided between the third flange and the second flange.

In accordance with a thirteenth aspect of the present invention, the derailleur according to the first aspect further comprises an additional link member configured to rotatably couple the first member to the base member. The second connecting portion of the second member is provided between the link member and the first connecting portion of the first member.

In accordance with a fourteenth aspect of the present invention, the derailleur according to the first aspect is configured so that the first connecting portion is configured to contact the second connecting portion.

In accordance with a fifteenth aspect of the present invention, the derailleur according to the first aspect is configured so that the first connecting portion includes an upstream end portion and a downstream end portion. The downstream end portion is disposed downstream of the upstream end portion in a chain driving direction. The shaft member is disposed closer to the upstream end portion than the downstream end portion in the chain driving direction in state where the base member is attached to the bicycle frame.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
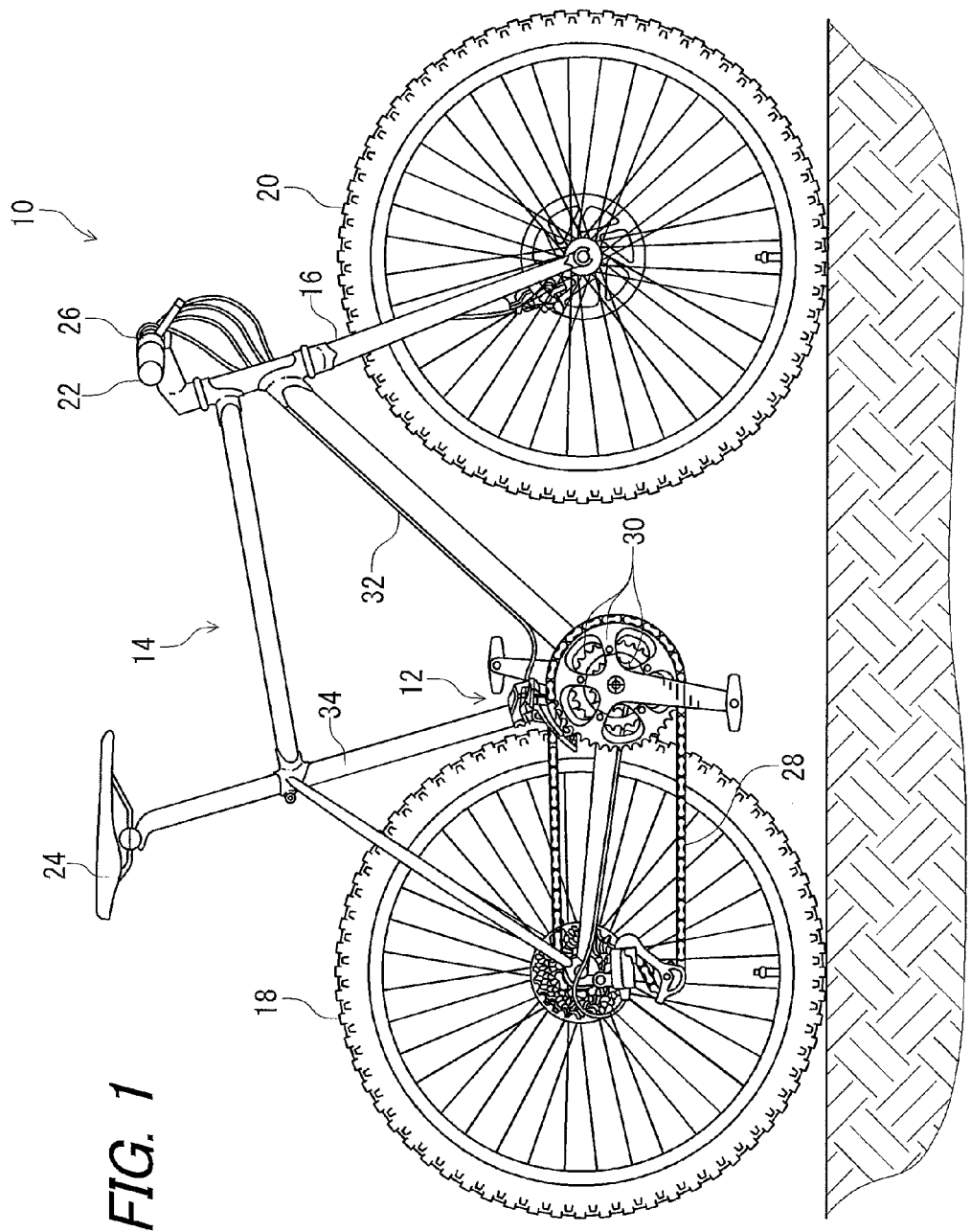
FIG. 1 is a side elevational view of a bicycle that is equipped with a derailleur in accordance with one embodiment.

The embodiments will now be described with reference to the accompanying drawings, wherein like reference numerals designate corresponding or identical elements throughout the various drawings.

Referring initially to FIG. 1, a bicycle 10 is illustrated that is equipped with a derailleur 12 in accordance with one embodiment. As explained below, the derailleur 12 is a front derailleur configured to be attachable to a bicycle frame 14 in detachable and reinstallable manner. The bicycle 10 includes a front fork 16, a rear wheel 18, a front wheel 20, a handlebar 22, and a saddle 24. The handlebar 22 is attached to a steerer tube or steering column of the front fork 16. In the illustrated embodiment, a shifter 26 is attached to the handlebar 22 for operating the derailleur 12 to laterally shift a chain 28 between three front sprockets or chain rings 30. The shifter 26 is operatively connected to the derailleur 12 by an operation cable 32. It will be apparent to those skilled in the bicycle field from the present disclosure that any shifter that uses an electrical operation device to operate the derailleur 12 can be used instead of a mechanical operation device such as the shifter 26. Here, the shifter 26 is illustrated on the right side of the handlebar 22. However, the shifter 26 can be provided on either the left or right side of the handlebar 22 for operating the derailleur 12 as need and/or desired.

In this embodiment, the following directional terms "front", "rear", "forward", "rearward", "left", "right", "transverse", "upward" and "downward" as well as any other similar directional terms refer to those directions which are determined on the basis of the rider who sits on the saddle 24 of the bicycle 10 with facing the handlebar 22, for example. Accordingly, these terms, as utilized to describe the derailleur 12, should be interpreted relative to the bicycle 10 as used in an upright riding position on a horizontal surface as illustrated in FIG. 1.

The bicycle 10 can be any type of bicycle and can have a variety of configurations. Since bicycles and their various components are well known in the bicycle field, the following specification does not include detailed descriptions and illustrations regarding the bicycle 10 and its various components other than the derailleur 12 of and the components or parts related to the derailleur 12. In other words, this specification describes and/or illustrates only the derailleur 12 and the components or parts of the bicycle 10 that is related to the derailleur 12.

Figure 2:
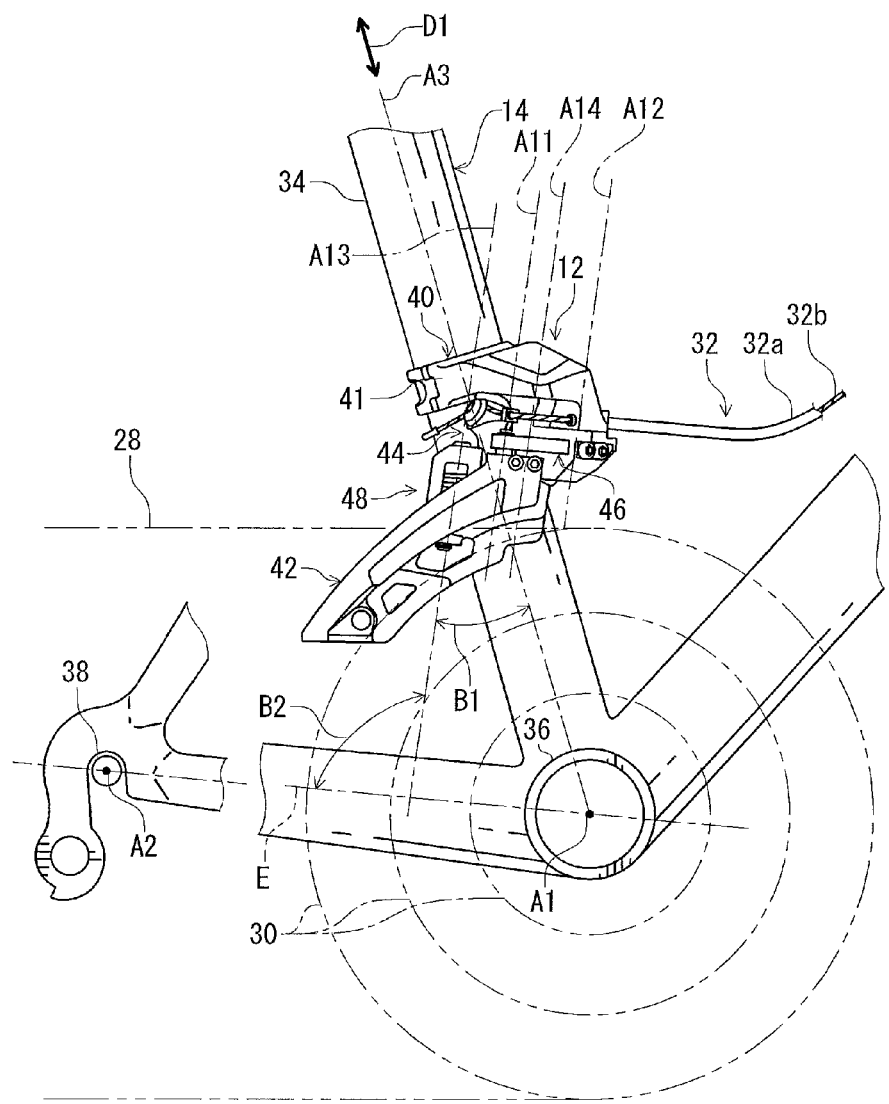
FIG. 2 is an enlarged outer side elevational view of a portion of the bicycle in the area of the derailleur.

Referring to FIG. 2, the derailleur 12 is mounted on a seat tube 34 of the bicycle frame 14. However, it will be apparent to those skilled in the bicycle field from the present disclosure that the derailleur 12 can be attached to a hanger tube 36 of the bicycle frame 14 by a bottom bracket or other mounting structure, if needed and/or desired. Furthermore, the configurations of the derailleur 12 can be applied to a rear derailleur if needed and/or desired.

As seen in FIG. 2, the bicycle 10 has a crank axis A1 and a rear wheel axis A2 which is parallel to the crank axis A1. The crank axis A1 is defined by the hanger tube 36 of the bicycle frame 14. In other words, the crank axis A1 corresponds to a center longitudinal axis of the hanger tube 36 and thus also corresponds to the center of rotation of the chain rings 30. As seen in FIG. 2, the rear wheel axis A2 is defined by a center axle 38 of the rear wheel 18.

As illustrated in FIG. 2, the derailleur 12 comprises a base member 40, a chain guide 42, a link member 46, an additional link member 44, and a biasing mechanism 48. The base member 40 is made of a rigid material such as a metal material or a fiber reinforced material. The base member 40 is configured to be attached to the bicycle frame 14. In the illustrated embodiment, the base member 40 is attached to the seat tube 34 of the bicycle frame 14 such that a position of the base member 40 with respect to the seat tube 34 is adjustable in an adjustment direction D1. More specifically, the base member 40 includes a clamp portion 41 configured to be attached to the seat tube 34. The adjustment direction D1 is defined along a center axis A3 of the seat tube 34. It will be apparent to those skilled in the bicycle field from the present disclosure that the base member 40 can have other configurations as needed and/or desired. For example, the base member 40 can be attached to the hanger tube 36 by the bottom bracket if needed and/or desired.

As illustrated in FIG. 2, the operation cable 32 includes an outer casing 32a and an inner cable 32b passing through the outer casing 32a. Thus, in the illustrated embodiment, the operation cable 32 is a conventional Bowden cable. For example, the inner cable 32b is slidably disposed inside the outer casing 32a. The inner cable 32b is attached to the additional link member 44.

Figure 3:
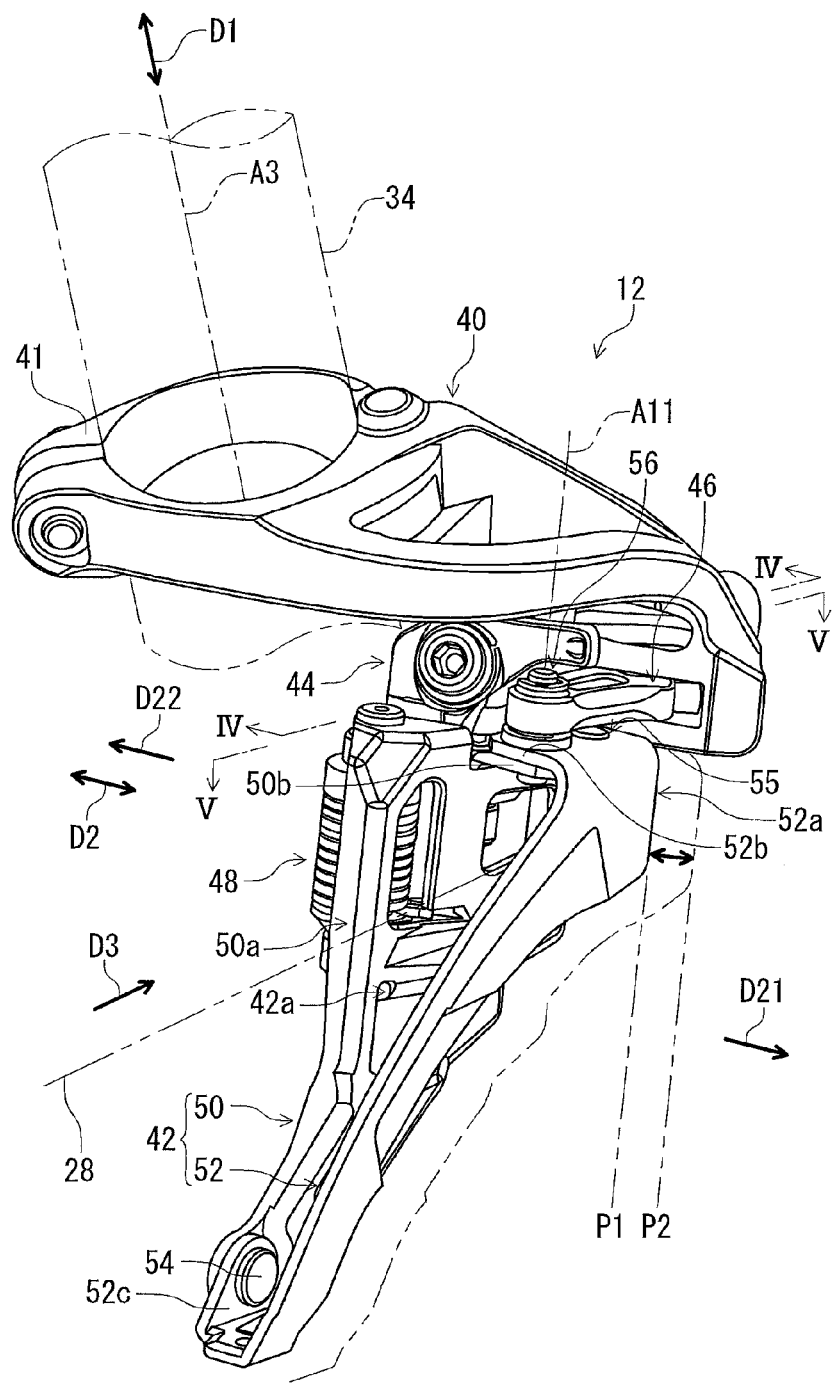
FIG. 3 is a rear perspective view of the derailleur illustrated in FIG. 2.

As illustrated in FIG. 3, the chain guide 42 is configured to be movable with respect to the base member 40 between a retracted position P1 and an extended position P2 at which the chain guide 42 is farther from the base member 40 than the retracted position P1. The chain guide 42 is configured to guide the chain 28. The chain guide 42 (the first member 50 and/or the second member 52) is made of a rigid material such as a metal material or a resin material. For example, the chain guide 42 (the first member 50 and/or the second member 52) is made of aluminum, an aluminum alloy, iron, stainless steel, or a synthetic resin material.

The chain guide 42 comprises a first member 50 and a second member 52. The first member 50 and the second member 52 are made of a metallic material such as aluminum, an aluminum alloy, iron, or stainless steel. It will be apparent to those skilled in the bicycle field from the present disclosure that the first member 50 can be made of a material different from a material of the second member 52.

The first member 50 is configured to contact and to laterally shift the chain 28 such that the chain 28 is moved in an outward direction D21 away from the bicycle frame 14 between the chain rings 30. The outward direction D21 is tone of a transverse direction D2 of the bicycle frame 14. The first member 50 includes a first guide portion 50a and a first connecting portion 50b. The first connecting portion 50b protrudes from the first guide portion 50a. The first connecting portion 50b is bent from an end part of the first guide portion 50a. However, it will be apparent to those skilled in the bicycle field from the present disclosure that the first connecting portion 50b does not need to protrude from the first guide portion 50a. The first connecting portion 50b does not need to be bent from the first guide portion 50a. The first connecting portion 50b can have other configurations as needed and/or desired. For example, the first connecting portion 50b can be a separate member from the first guide portion 50a and can be connected with the first guide portion 50a using other suitable attaching structures such as welding, riveting or bolting if needed and/or desired.

The second member 52 is configured to contact and to laterally shift the chain 28 such that the chain 28 is moved in an inward direction D22 toward the bicycle frame 14 between the chain rings 30. The inward direction D22 is the other of the transverse direction D2 and is opposite to the outward direction D21. The second member 52 includes a second guide portion 52a and a second connecting portion 52b to overlap the first connecting portion 50b. The second connecting portion 52b protrudes from the second guide portion 52a toward the first guide portion 50a. The second connecting portion 52b is bent from an end part of the second guide portion 52a. However, it will be apparent to those skilled in the bicycle field from the present disclosure that the second connecting portion 52b does not need to protrude from the second guide portion 52a. The second connecting portion 52b does not need to be bent from the second guide portion 52a. The second connecting portion 52b can have other configurations as needed and/or desired. For example, the second connecting portion 52b can be a separate member from the second guide portion 52a and can be connected with the second guide portion 52a using other suitable attaching structures such as welding, riveting or bolting if needed and/or desired.

In the illustrated embodiment, the first member 50 is disposed closer to the bicycle frame 14 than the second member 52. The first guide portion 50a is disposed closer to the bicycle frame 14 than the second guide portion 52a. The first guide portion 50a is spaced apart from the second guide portion 52a to define a chain guiding slot 42a through which the chain 28 extends in a chain driving direction D3. The chain driving direction D3 is defined with respect to the derailleur 12 as a direction in which the chain 28 is driven by the rider's pedaling force to forwardly move the bicycle 10.

The second member 52 further includes a third connecting portion 52c. The third connecting portion 52c is disposed at a lower end portion of the second guide portion 52a. The third connecting portion 52c is coupled to a lower end portion of the first guide portion 50a by a fastener 54 (e.g., a rivet). In the illustrated embodiment, the first member 50 and the second member 52 are separate members from one another. Accordingly, the workability of the first member 50 and the second member 52 improves compared with a chain guide in which the first member 50 and the second member 52 are provided integrally with one another as a one-piece unitary member. Furthermore, since the first member 50 and the second member 52 are separate members from one another, the thickness of coating provided on the first member 50 can be different from the thickness of coating provided on the second member 52. This allows the thickness of the coating of one of the first member 50 and the second member 52 to be reduced in accordance with the depth of wear of each of the first member 50 and the second member 52, allowing the chain guide 42 to be light. Similarly, since the first member 50 and the second member 52 are separate members from one another, the thickness of the first member 50 can be different from the thickness of the second member 52. This allows the thickness of one of the first member 50 and the second member 52 to be reduced in accordance with the depth of wear of each of the first member 50 and the second member 52, allowing the chain guide 42 to be light. However, it will be apparent to those skilled in the bicycle field from the present disclosure that the first member 50 can be provided integrally with the second member 52 as a one-piece unitary member. For example, the third connecting portion 52c can be provided integrally with the lower end portion of the first guide portion 50a as a one-piece unitary member.

As illustrated in FIG. 3, the first connecting portion 50b and the second connecting portion 52b are provided at an upper end portion of the chain guide 42. However, it will be apparent to those skilled in the bicycle field from the present disclosure that the first connecting portion 50b and the second connecting portion 52b can be provided at a portion other than the upper end portion of the chain guide 42. The first connecting portion 50b is disposed at an upper end portion of the first guide portion 50a. The second connecting portion 52b is disposed at an upper end portion of the second guide portion 52a. In the illustrated embodiment, the first connecting portion 50b is provided under the second connecting portion 52b.

Figure 4:
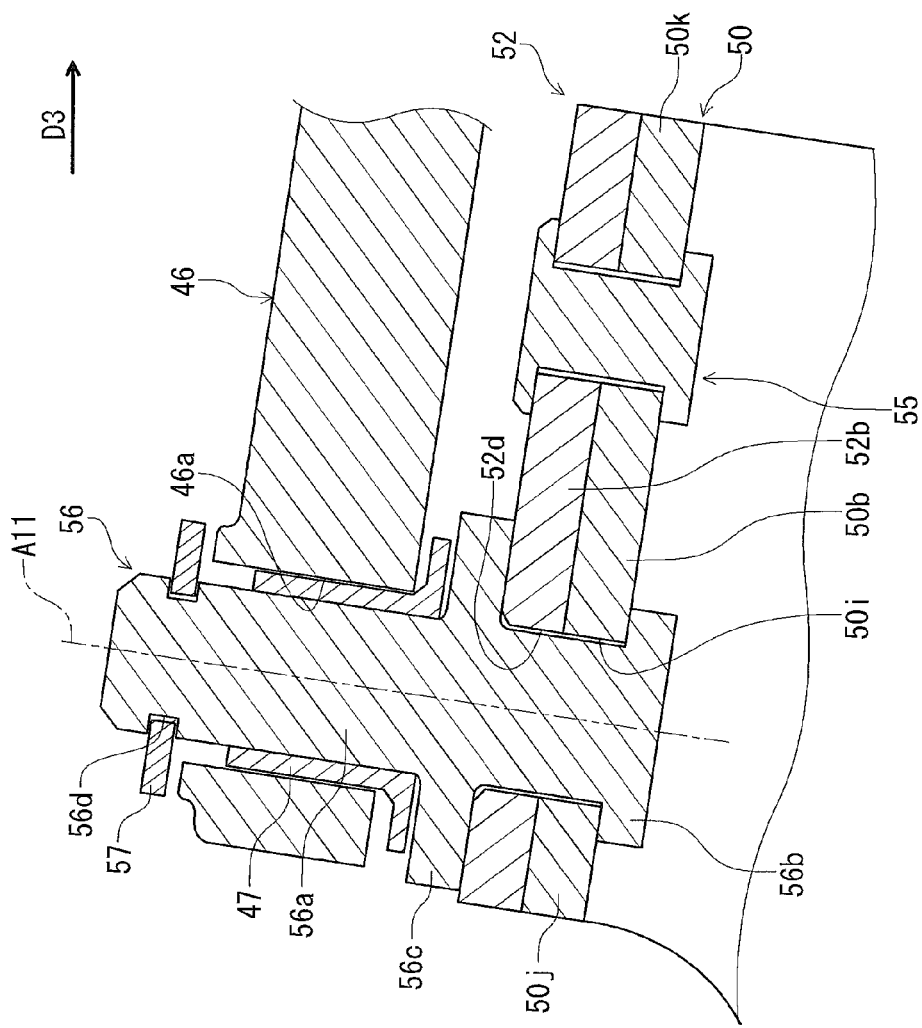
FIG. 4 is a cross-sectional view of the derailleur taken along line IV-IV of FIG. 3.

As illustrated in FIG. 4, the first connecting portion 50b is coupled to the second connecting portion 52b by a fastener 55 and a shaft member 56. The fastener 55 is a rivet, for example. The shaft member 56 is configured to couple the first connecting portion 50b to the second connecting portion 52b and configured to rotatably couple the chain guide 42 to the link member 46. Since the shaft member 56 rotatably couples the chain guide 42 to the link member 46 in addition to coupling the first connecting portion 50b to the second connecting portion 52b, the structure of the derailleur 12 can be simplified.

The shaft member 56 includes a shaft main body 56a, a first flange 56b, a second flange 57, and a third flange 56c. The shaft member 56 is made of a rigid material such as a metallic material. The shaft member 56 is made of aluminum, an aluminum alloy, iron, or stainless steel, for example. The shaft main body 56a extends along the first rotation axis A11.

The first flange 56b is provided at a lower end of the shaft main body 56a. The first flange 56b has an outer diameter larger than an outer diameter of the lower end of the shaft main body 56a. The first flange 56b is a caulked portion and is provided integrally with the shaft main body 56a as a one-piece unitary member. However, it will be apparent to those skilled in the bicycle field from the present disclosure that the first flange 56b can have other configurations instead of the caulked portion. The first flange 56b can be a separate member from the shaft main body 56a as well as the second flange 57. The first flange 56b can be a separate member such as a snap ring or a nut configured to be detachably attached to the shaft main body 56a, for example.

The second flange 57 is a snap ring configured to be detachably attached to the shaft main body 56a. The second flange 57 is provided in an attachment groove 56d provided at an upper end of the shaft main body 56a. The second flange 57 has an outer diameter larger than an outer diameter of the upper end of the shaft main body 56a. The second flange 57 prevents the link member 46 from being removed from the shaft member 56. It will be apparent to those skilled in the bicycle field from the present disclosure that the second flange 57 can have other configurations instead of the snap ring. For example, the second flange 57 can be a nut. Furthermore, the second flange 57 can be integrally provided with the shaft main body 56a as a one-piece unitary member. The second flange 57 can be a caulked portion as well as the first flange 56b, for example.

The third flange 56c is provided between the first flange 56b and the second flange 57. The third flange 56c has an outer diameter larger than an outer diameter of the shaft main body 56a. The third flange 56c is provided integrally with the shaft main body 56a as a one-piece unitary member. However, it will be apparent to those skilled in the bicycle field from the present disclosure that the third flange 56c can have other configurations. The third flange 56c can be a separate member such as a snap ring configured to be detachably attached to the shaft main body 56a. Furthermore, it will be apparent to those skilled in the bicycle field from the present disclosure that the third flange 56c can be omitted if needed and/or desired.

The link member 46 includes a first link through-hole 46a through which the shaft member 56 extends. A bush 47 is attached to the shaft member 56 and is provided in the first link through-hole 46a. The first connecting portion 50b includes a first through-hole 50i. The second connecting portion 52b includes a second through-hole 52d. The shaft member 56 extends through the first through-hole 50i and the second through-hole 52d. An outer diameter of the first flange 56b is larger than inner diameters of the first through-hole 50i and the second through-hole 52d. An outer diameter of the second flange 57 is larger than an inner diameter of the first link through-hole 46a. An outer diameter of the third flange 56c is larger than the inner diameters of the first through-hole 50i, the second through-hole 52d and the first link through-hole 46a. It will be apparent to those skilled in the bicycle field from the present disclosure that the first through-hole 50i can be a recess or a cutout through which the shaft member 56 extends instead of the first through-hole 50i. Furthermore, the second through-hole 52d can be a recess or a cutout through which the shaft member 56 extends instead of the second through-hole 52d.

The first connecting portion 50b, the second connecting portion 52b, and the link member 46 are provided between the first flange 56b and the second flange 57. The first connecting portion 50b and the second connecting portion 52b are provided between the first flange 56b and the link member 46. More specifically, the first connecting portion 50b and the second connecting portion 52b are provided between the first flange 56b and the third flange 56c. The link member 46 is provided between the third flange 56c and the second flange 57. The first connecting portion 50b is secured to the second connecting portion 52b using the first flange 56b and the third flange 56c to integrally provide the chain guide 42. The first connecting portion 50b and the second connecting portion 52b are sandwiched between the first flange 56b and the third flange 56c without any gaps. On the other hand, the link member 46 is rotatably provided relative to the chain guide 42 between the second flange 57 and the third flange 56c. The link member 46 is sandwiched between the second flange 57 and the third flange 56c with a gap to be rotatable relative to the chain guide 42. In the illustrated embodiment, the second connecting portion 52b of the second member 52 is provided between the link member 46 and the first connecting portion 50b of the first member 50. It will be apparent to those skilled in the bicycle field from the present disclosure that the first connecting portion 50b can be provided between the link member 46 and the second connecting portion 52b. The first connecting portion 50b is configured to contact the second connecting portion 52b. It will be apparent to those skilled in the bicycle field from the present disclosure that at least one intermediate member can be provided between the first connecting portion 50b and the second connecting portion 52b.

As illustrated in FIG. 4, the shaft member 56 is provided on an upstream side of the fastener 55 in the chain driving direction D3. The terms "upstream" and "downstream" as used herein is defined with respect to the chain driving direction D3. The first connecting portion 50b includes an upstream end portion 50j and a downstream end portion 50k. The downstream end portion 50k is disposed downstream of the upstream end portion 50j in the chain driving direction D3. The shaft member 56 is disposed closer to the upstream end portion 50j than the downstream end portion 50k in the chain driving direction D3 in state where the base member 40 is attached to the bicycle frame 14. It will be apparent to those skilled in the bicycle field from the present disclosure that the shaft member 56 can be disposed at other positions within the first connecting portion 50b and the second connecting portion 52b. The shaft member 56 can be disposed closer to the downstream end portion 50k than the upstream end portion 50j in the chain driving direction D3, for example.

Figure 5:
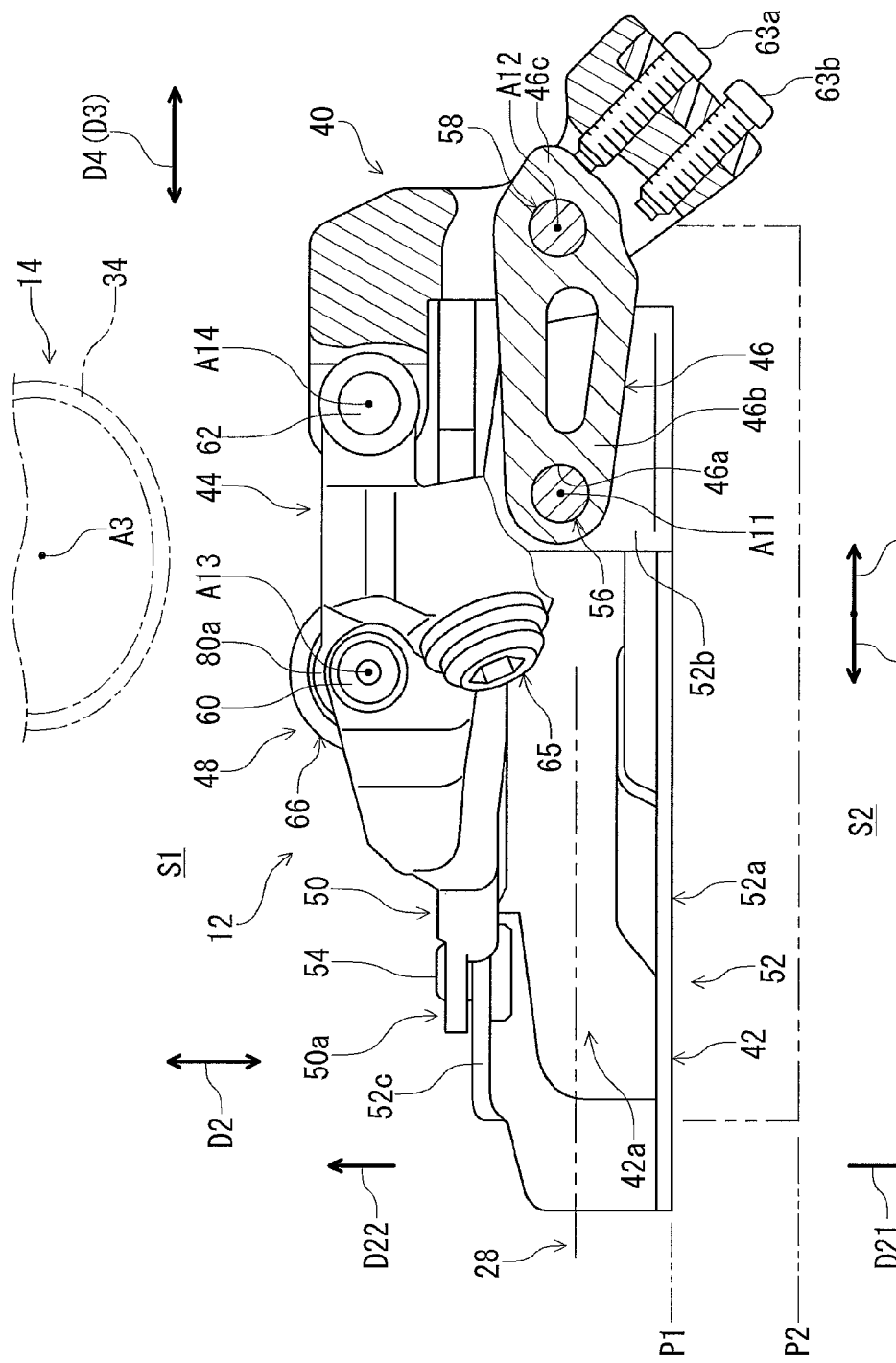
FIG. 5 is a cross-sectional view of the derailleur taken along line V-V of FIG. 3.

As illustrated in FIG. 5, the link member 46 is configured to movably couple the chain guide 42 to the base member 40. More specifically, the link member 46 is configured to couple the chain guide 42 to the base member 40 such that the chain guide 42 is movable with respect to the base member 40 between the retracted position P1 and the extended position P2. The link member 46 includes a first link end portion 46b and a second link end portion 46c. The second link end portion 46c is opposite to the first link end portion 46b. The first link end portion 46b is rotatably coupled to the chain guide 42 about a first rotation axis A11 by the shaft member 56. The second link end portion 46c is rotatably coupled to the base member 40 about a second rotation axis A12 by a first link shaft 58.

As illustrated in FIG. 5, the additional link member 44 is configured to movably couple the chain guide 42 to the base member 40. More specifically, the additional link member 44 is configured to rotatably couple the first member 50 to the base member 40. The additional link member 44 is rotatably coupled to the base member 40 about a third rotation axis A13 by a rotational axle 60. The chain guide 42 is pivotally connected to the additional link member 44 via the rotational axle 60. The additional link member 44 is rotatably coupled to the base member 40 about a fourth rotation axis A14 by a second link shaft 62. As seen in FIG. 5, the additional link member 44 is configured to couple the chain guide 42 to the base member 40 such that the base member 40, the chain guide 42, the additional link member 44, and the link member 46 define a four-bar linkage. It will be apparent to those skilled in the bicycle field from the present disclosure that other linkage structures can be applied to the derailleur 12.

When viewed along the crank axis A1 as illustrated in FIG. 2, the first rotation axis A11, the second rotation axis A12, the third rotation axis A13, and the fourth rotation axis A14 are substantially parallel to one another. When viewed along the crank axis A1, the first rotation axis A11, the second rotation axis A12, the third rotation axis A13, and the fourth rotation axis A14 are not parallel and not orthogonal to the adjustment direction D1 in a state where the derailleur 12 is attached to the bicycle frame 14 to properly shift the chain 28. When viewed along the crank axis A1, the first rotation axis A11, the second rotation axis A12, the third rotation axis A13, and the fourth rotation axis A14 are inclined with respect to the adjustment direction D1 at a first angle B1 in a state where the derailleur 12 is attached to the bicycle frame 14 to properly shift the chain 28. The first angle B1 can be set within a range between approximately zero degree and approximately 30 degrees, for example. Furthermore, when viewed along the crank axis A1, the first rotation axis A11, the second rotation axis A12, the third rotation axis A13, and the fourth rotation axis A14 are inclined with respect to a virtual plane E at a second angle B2 in a state where the derailleur 12 is attached to the bicycle frame 14 to properly shift the chain 28. The second angle B2 can be set within a range between approximately 80 degrees and approximately 100 degrees, for example. The virtual plane E is defined to be parallel to the crank axis A1 and the rear wheel axis A2.

Returning to FIG. 5, the additional link member 44 is configured to move in a forward-rearward direction D4 of the bicycle frame 14 when the chain guide 42 moves between the refracted position P1 and the extended position P2. When viewed from a vertical direction of the bicycle frame 14, the forward-rearward direction D4 substantially coincides with the chain driving direction D3 in a state where the derailleur 12 is attached to the bicycle frame 14. The additional link member 44 is arranged closer to the bicycle frame 14 than the link member 46 when the base member 40 is attached to the bicycle frame 14. The additional link member 44 includes a cable attachment portion 65 to which the operation cable 32 is to be attached. The cable attachment portion 65 is configured to be pulled via the operation cable 32 in a forward direction D41 of the bicycle frame 14. The forward direction D41 is one of the forward-rearward direction D4.

When the cable attachment portion 65 is pulled via the operation cable 32 in the forward direction D41, the additional link member 44 is rotated with respect to the base member 40 about the fourth rotation axis A14. This causes the chain guide 42 to be moved from the retracted position P1 to the extended position P2 in the forward direction D41 against the biasing force of the biasing mechanism 48. More specifically, the chain guide 42 is moved from the retracted position P1 to the extended position P2 in the forward direction D41 and moved in the outward direction D22 away from the bicycle frame 14 by pulling the operation cable 32.

When the pulling force of the operation cable 32 is released, the chain guide 42 is moved from the extended position P2 to the retracted position P1. More specifically, the chain guide 42 is moved from the extended position P2 to the retracted position P1 in the rearward direction D42 and moved in the inward direction D22 by releasing the operation cable 32. In this way, the chain guide 42 selectively positions the chain 28 over one of the chain rings 30 in response to the operation of the shifter 26. The rearward direction D42 is the other of the forward-rearward direction D4 and is opposite to the forward direction D41.

It will be apparent to those skilled in the bicycle field from the present disclosure that the chain guide 42 can be configured to move away from the base member 40 in the rearward direction D42 of the bicycle frame 14 when the chain guide 42 moves from the retracted position P1 to the extended position P2. It will be apparent to those skilled in the bicycle field from the present disclosure that the cable attachment portion 65 can be mounted on the link member 46. Furthermore, an electric driving apparatus can be applied to the derailleur 12 to move the chain guide 42 relative to the base member 40 instead of the operation cable 32 and the cable attachment portion 65.

As illustrated in FIG. 5, the shaft member 56 is configured to move away from the base member 40 in the forward direction D41 of the bicycle frame 14 when the chain guide 42 moves from the retracted position P1 to the extended position P2. However, it will be apparent to those skilled in the bicycle field from the present disclosure that the shaft member 56 can be configured to move away from the base member 40 in the rearward direction D42 of the bicycle frame 14 when the chain guide 42 moves from the retracted position P1 to the extended position P2. Since the shaft member 56 is movable relative to the base member 40 in the forward-rearward direction D4, a connecting part at which the first connecting portion 50b is connected with the second connecting portion 52b can be disposed on a rotation axis (i.e., the first rotation axis A11) of the chain guide 42 and the link member 46. This allows the shaft member 56 to function as both the rotation axis and the connecting part.

As illustrated in FIG. 5, end shift stage positions of the chain guide 42 with respect to the base member 40 are adjustable by turning a low shift stage adjustment screw 63a and a top shift stage adjustment screw 63b. In this way, the range of movement of the chain guide 42 is adjustable with respect to the base member 40. In particular, the low shift stage adjustment screw 63a contacts an abutment of the link member 46 when the chain guide 42 is located in the low shift stage (gear) position (i.e., the retracted position P1). The top shift stage adjustment screw 63b contacts an abutment of the link member 46 when the chain guide 42 is located in the top shift stage (gear) position (i.e., the extended position P2). In the illustrated embodiment, the abutment of the link member 46 is pressed against the low shift stage adjustment screw 63a by the biasing force of the biasing mechanism 48.

Figure 6:
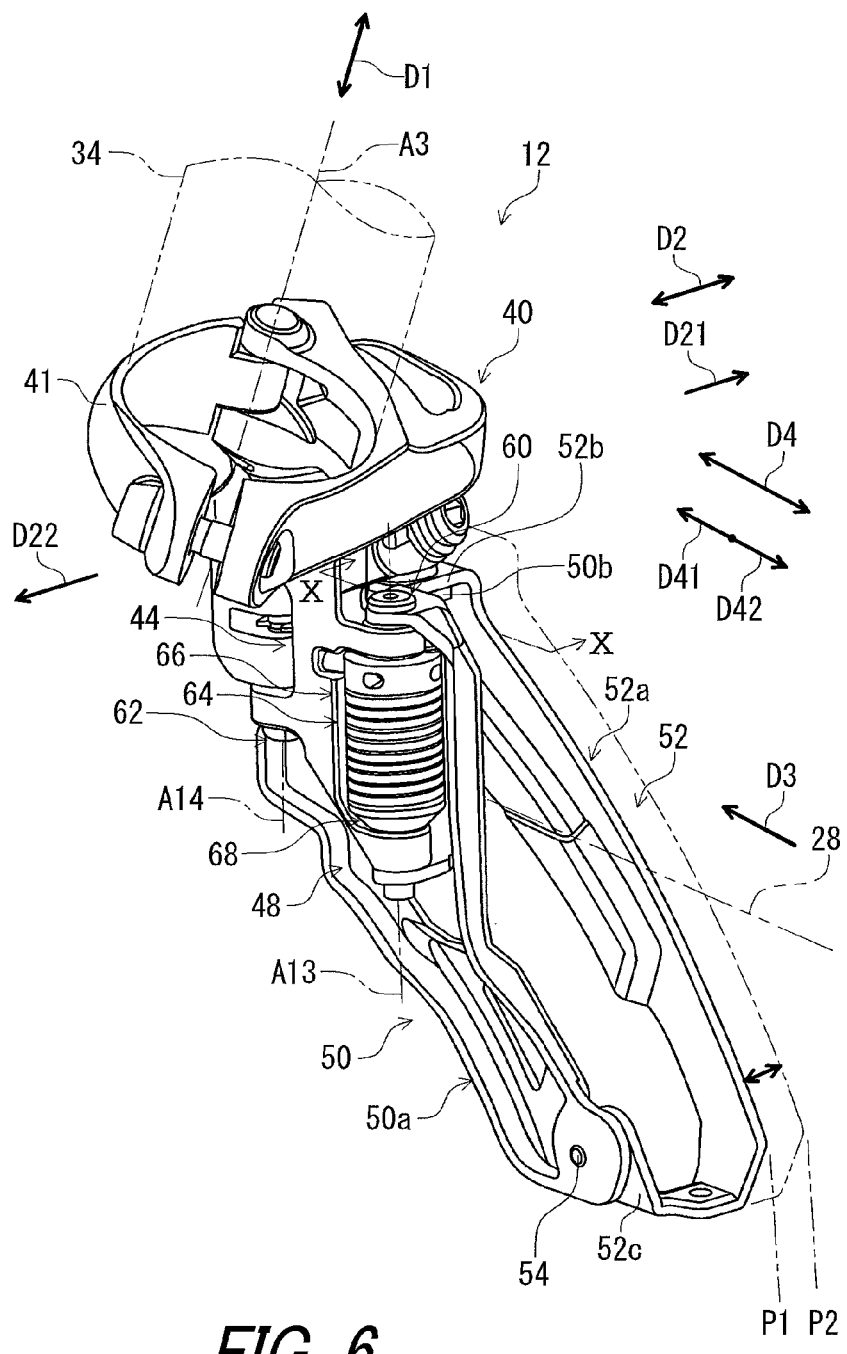
FIG. 6 is a rear perspective view of the derailleur illustrated in FIG. 2.

As illustrated in FIG. 6, the biasing mechanism 48 is configured to bias (press) the additional link member 44 such that the chain guide 42 is disposed at one of the retracted position P1 and the extended position P2. In the illustrated embodiment, the biasing mechanism 48 is configured to bias the additional link member 44 such that the chain guide 42 is disposed at the retracted position P1. However, it will be apparent to those skilled in the bicycle field from the present disclosure that the biasing mechanism 48 can be configured to bias the additional link member 44 such that the chain guide 42 is disposed at the extended position P2.

The biasing mechanism 48 comprises a biasing member 64, an intermediate member 66, and a support member 68. The biasing member 64 has a first end portion 64b and a second end portion 64c. The intermediate member 66 is separately provided from the chain guide 42 and the additional link member 44 so as to transmit biasing force of the biasing member 64 from the first end portion 64b to one of the chain guide 42 and the additional link member 44 through the intermediate member 66. In the illustrated embodiment, the intermediate member 66 is configured to transmit the biasing force of the biasing member 64 from the first end portion 64b to the additional link member 44. However, it will be apparent to those skilled in the bicycle field from the present disclosure that the intermediate member 66 can be configured to transmit the biasing force of the biasing member 64 from the first end portion 64b to the chain guide 42. The biasing member 64, the intermediate member 66, and the support member 68 are configured to be rotatable with respect to the chain guide 42 and the additional link member 44 about the third rotation axis A13.

As illustrated in FIG. 5, the intermediate member 66 is provided on a first side S1 of the chain guide 42. The first side S1 is opposite to a second side S2 of the chain guide 42 and is closer to the bicycle frame 14 than the second side S2 in a state where the base member 40 is attached to the bicycle frame 14. However, it will be apparent to those skilled in the bicycle field from the present disclosure that the intermediate member 66 can be provided on the second side S2 of the chain guide 42. The intermediate member 66 is provided above the biasing member 64. The support member 68 is provided under the biasing member 64. However, it will be apparent to those skilled in the bicycle field from the present disclosure that the intermediate member 66 can be provided under the biasing member 64 and that the support member 68 can be provided above the biasing member 64.

Figure 7:
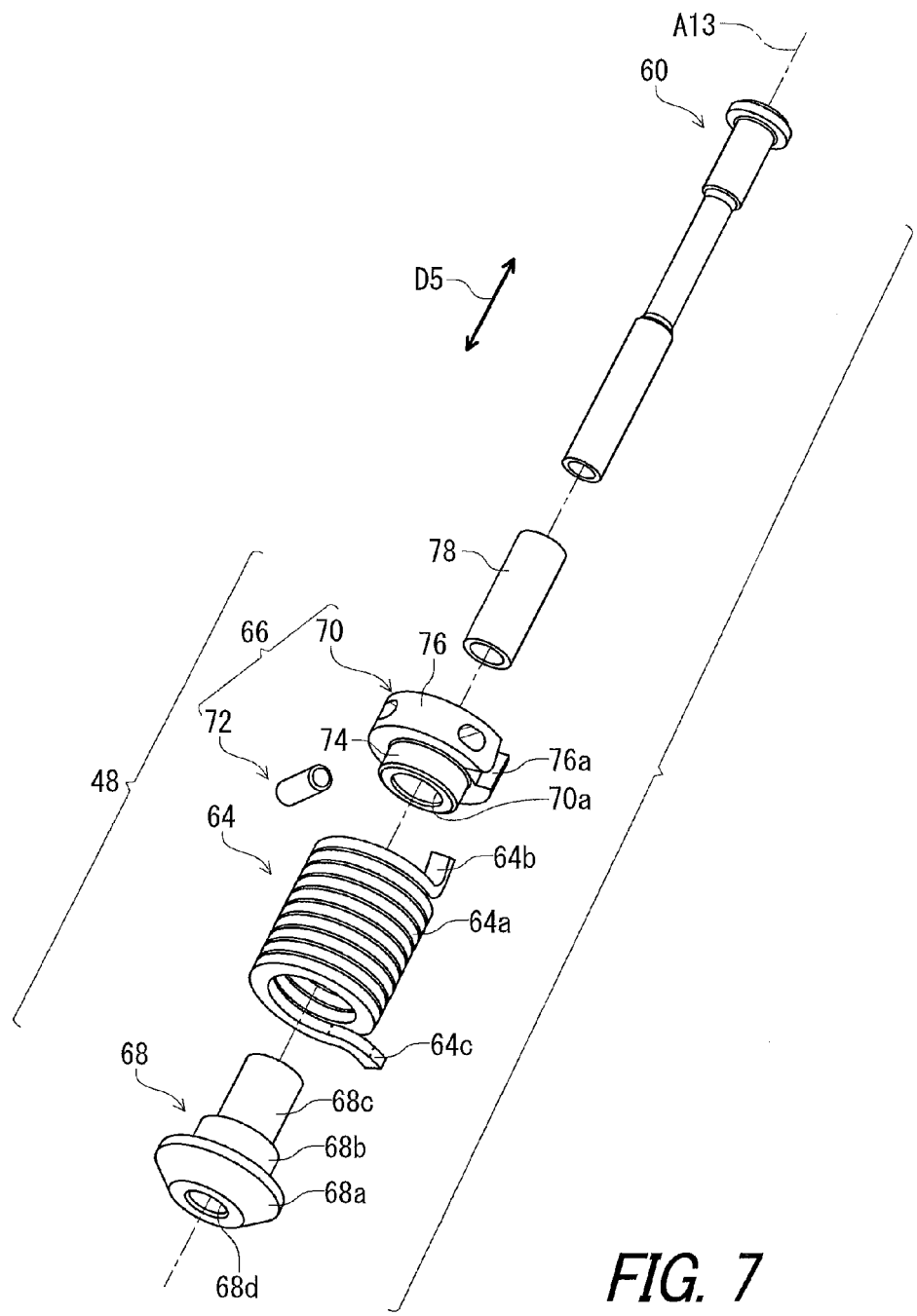
FIG. 7 is an exploded perspective view of a biasing mechanism of the derailleur illustrated in FIG. 6.

As illustrated in FIG. 7, the biasing member 64 comprises a torsion spring including a cylindrical part 64a to generate biasing force around the third rotation axis A13. However, it will be apparent to those skilled in the bicycle field from the present disclosure that the biasing member 64 can be a member configured to generate biasing force other than the torsion spring. The first end portion 64b extends from the cylindrical part 64a along the third rotation axis A13. The second end portion 64c extends from the cylindrical part 64a along a radial direction of the cylindrical part 64a. In the illustrated embodiment, the first end portion 64b is provided at an upper end portion of the cylindrical part 64a, and the second end portion 64c is provided at a lower end portion of the cylindrical part 64a. The first end portion 64b is configured to engage with the intermediate member 66. The second end portion 64c is configured to engage with the chain guide 42. The cylindrical part 64a of the biasing member 64, the intermediate member 66, and the support member 68 are arranged on the rotational axle 60.

The intermediate member 66 includes a first part 70 and a second part 72. The first part 70 is configured to engage with the first end portion 64b of the biasing member 64. The second part 72 is configured to engage with the one of the additional link member 44 and the chain guide 42 and is configured to be detachably attached to the first part 70. In the illustrated embodiment, the second part 72 comprises a pin configured to engage with a pin engaging opening 76e (FIG. 9) which will be described later.

The first part 70 includes an inside portion 74 and an outside portion 76. The inside portion 74 is configured to be provided inside the cylindrical part 64a of the biasing member 64. The inside portion 74 protrudes from the outside portion 76 along the third rotation axis A13. The inside portion 74 is configured to contact an inner peripheral surface of the cylindrical part 64a in a radial direction. The outside portion 76 is configured to be provided outside the cylindrical part 64a. The outside portion 76 is configured to engage with the first end portion 64b of the biasing member 64. The outside portion 76 is configured to contact an upper end surface of the cylindrical part 64a in an axial direction. The second part 72 is configured to be detachably attached to the outside portion 76. In the illustrated embodiment, the first part 70 is made of a rigid material such as a metallic material. The first part 70 is made of aluminum, an aluminum alloy, iron, or stainless steel, for example. Similarly, the second part 72 is made of a rigid material such as a metallic material. The second part 72 is made of aluminum, an aluminum alloy, iron, or stainless steel, for example.

The first part 70 includes a through-hole 70a through which the rotational axle 60 extends. The through-hole 70a extends along the third rotation axis A13 and is provided in the inside portion 74 and the outside portion 76. In the illustrated embodiment, a bush 78 extends through the through-hole 70a. The rotational axle 60 extends through the bush 78.

The outside portion 76 includes an engagement groove 76a with which the first end portion 64b of the biasing member 64 engages. However, it will be apparent to those skilled in the bicycle field from the present disclosure that the inside portion 74 can be configured to engage with the first end portion 64b of the biasing member 64 instead of the outside portion 76. It will be apparent to those skilled in the bicycle field from the present disclosure that the inside portion 74 can be omitted.

The support member 68 is configured to support a lower end portion of the biasing member 64. The support member 68 is provided on an opposite side of the intermediate member 66 with respect to the biasing member 64. In the illustrated embodiment, the support member 68 is made of a rigid material such as a metallic material. The support member 68 is made of aluminum, an aluminum alloy, iron, or stainless steel, for example. The support member 68 includes an end support portion 68a, an intermediate portion 68b, and an inner support portion 68c.

The end support portion 68a is configured to be provided outside the cylindrical part 64a of the biasing member 64. The end support portion 68a is configured to contact a lower end surface of the biasing member 64 in an axial direction D5 of the rotational axle 60. The axial direction D5 is parallel to the third rotation axis A13. The intermediate portion 68b and the inner support portion 68c are configured to be provided inside of the cylindrical part 64a. The support member 68 includes a through-hole 68d extending along the third rotation axis A13. The rotational axle 60 extends through the through-hole 68d along the third rotation axis A13. It will be apparent to those skilled in the bicycle field from the present disclosure that the support member 68 can be omitted if needed and/or desired.

Figure 8:
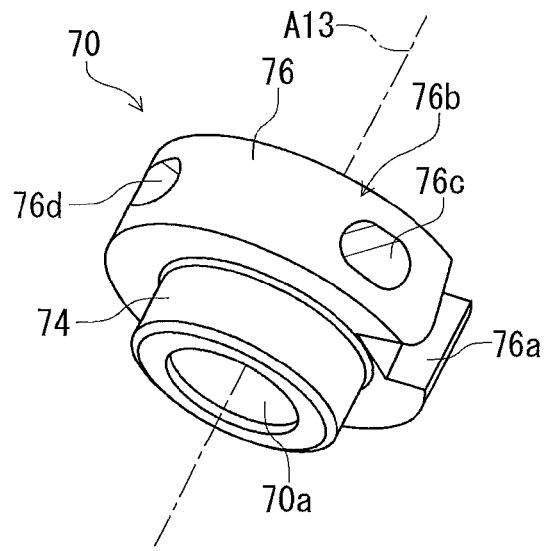
FIG. 8 is a perspective view of a first part of the biasing mechanism illustrated in FIG. 7.

As illustrated in FIG. 8, the outside portion 76 includes a tool engagement portion 76b with which a tool is to engage when the derailleur 12 is assembled. The tool engagement portion 76b comprises a plurality of tool engaging openings 76c and 76d with which the tool is to engage when the derailleur 12 is assembled. However, it will be apparent to those skilled in the bicycle field from the present disclosure that the tool engagement portion 76b can comprise at least one tool engaging opening with which the tool is to engage when the derailleur 12 is assembled.

Each of the tool engaging openings 76c and 76d extends in a radial direction of the outside portion 76. The radial direction of the outside portion 76 is perpendicular to the third rotation axis A13. Each of the tool engaging openings 76c and 76d is an elongated through-hole. However, it will be apparent to those skilled in the bicycle field from the present disclosure that each of the tool engaging openings 76c and 76d can have other configurations such as a bottomed hole, a recess, or a groove instead of a through-hole. In the illustrated embodiment, the tool engaging openings 76c and 76d have the same shape as each other. It will be apparent to those skilled in the bicycle field from the present disclosure that the tool engaging openings 76c and 76d can have different shapes from each other.

Figure 9:
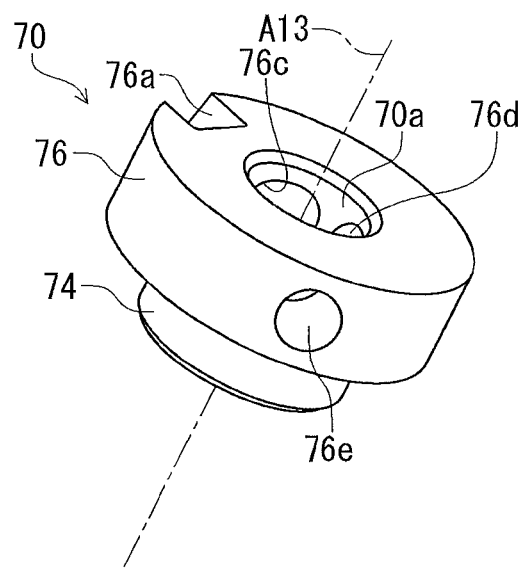
FIG. 9 is a perspective view of the first part of the biasing mechanism illustrated in FIG. 7.

As illustrated in FIGS. 8 and 9, each of the tool engaging openings 76c and 76d extends from an outer periphery of the outside portion 76 to the through-hole 70a. The tool engaging opening 76c is spaced apart from the tool engaging opening 76d in a circumferential direction of the outside portion 76. In the illustrated embodiment, the tool engaging opening 76c is closer to the engagement groove 76a than the tool engaging opening 76d.

As illustrated in FIG. 9, the outside portion 76 further includes the pin engaging opening 76e. The pin engaging opening 76e is a through-hole extending in the radial direction of the outside portion 76 from the outer periphery of the outside portion 76 to the through-hole 70a. The second part 72 (FIG. 7) engages with the pin engaging opening 76e. The second part (pin) 72 is inserted into the pin engaging opening 76e when the derailleur 12 is assembled. It will be apparent to those skilled in the bicycle field from the present disclosure that the pin engaging opening 76e can have other configurations such as a bottomed hole, a recess, or a groove instead of a through-hole.

Figure 10:
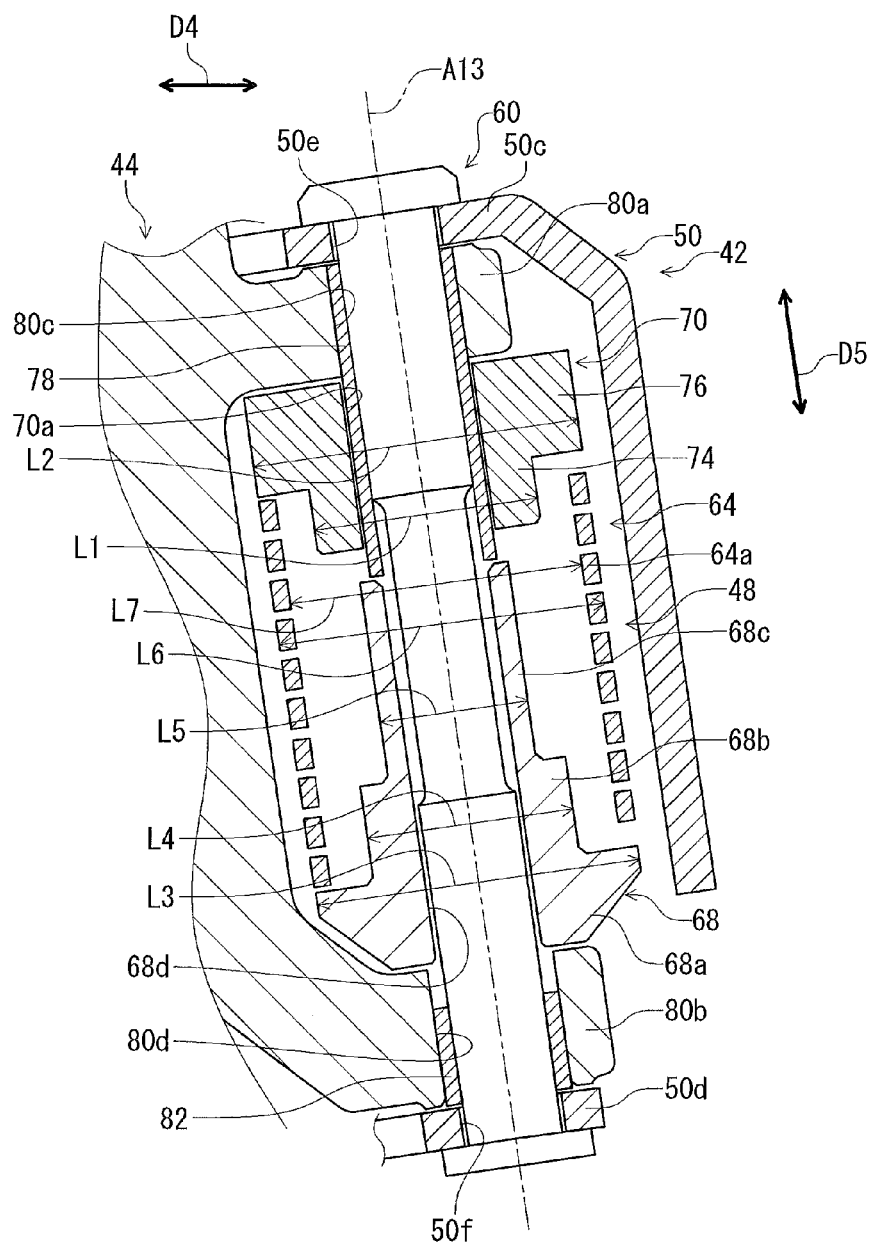
FIG. 10 is a cross-sectional view of the derailleur taken along line X-X of FIG. 6.

As illustrated in FIG. 10, the inside portion 74 has a first outer diameter L1. The outside portion 76 has a second outer diameter L2 which is larger than the first outer diameter L1. The end support portion 68a has a third outer diameter L3. The intermediate portion 68b has a fourth outer diameter L4. The inner support portion 68c has a fifth outer diameter L5. The third outer diameter L3 is larger than the fourth outer diameter L4 and the fifth outer diameter L5. The fourth outer diameter L4 is larger than the fifth outer diameter L5. The third outer diameter L3 is substantially the same as the second outer diameter L2. The cylindrical part 64a of the biasing member 64 has a sixth outer diameter L6 and an inner diameter L7. The second outer diameter L2 and the third outer diameter L3 are substantially the same as the sixth outer diameter L6 and are larger than the inner diameter L7.

As illustrated in FIG. 10, the additional link member 44 includes distal end portions 80a and 80b. The distal end portions 80a and 80b are pivotally connected to the chain guide 42. The distal end portion 80b is spaced apart from the distal end portion 80a along the third rotation axis A13. Each of the distal end portions 80a and 80b is pivotally connected to the chain guide 42 about the third rotation axis A13 by the rotational axle 60. The biasing mechanism 48 is provided between the distal end portions 80a and 80b in the axial direction D5. The outside portion 76 is provided between the biasing member 64 and the additional link member 44 in the axial direction D5 of the rotational axle 60. More specifically, the outside portion 76 is provided between the distal end portion 80a and the biasing member 64 (the cylindrical part 64a) in the axial direction D5. The end support portion 68a is provided between the distal end portion 80b and the biasing member 64 (the cylindrical part 64a).

The first member 50 of the chain guide 42 includes a first support portion 50c and a second support portion 50d. The second support portion 50d is spaced apart from the first support portion 50c along the third rotation axis A13. The distal end portion 80a is pivotally connected to the first support portion 50c about the third rotation axis A13 by the rotational axle 60. The distal end portion 80b is pivotally connected to the second support portion 50d about the third rotation axis A13 by the rotational axle 60. The distal end portions 80a and 80b are provided between the first support portion 50c and the second support portion 50d along the third rotation axis A13.

The first support portion 50c includes a first support through-hole 50e. The distal end portion 80a includes a through-hole 80c. The rotational axle 60 extends through the first support through-hole 50e and the through-hole 80c. The bush 78 is provided in the through-hole 80c. The second support portion 50d includes a second support through-hole 50f. The distal end portion 80b includes a through-hole 80d. The rotational axle 60 extends through the second support through-hole 50f and the through-hole 80d. A bush 82 is attached to the rotational axle 60 and is provided in the through-hole 80d.

As illustrated in FIG. 5, the additional link member 44 is configured such that the distal end portions 80a and 80b move in the forward-rearward direction D4 of the bicycle frame 14 when the chain guide 42 moves between the retracted position P1 and the extended position P2. In the illustrated embodiment, the additional link member 44 is configured such that the distal end portions 80a and 80b move in the forward direction D41 of the bicycle frame 14 when the chain guide 42 moves from the retracted position P1 to the extended position P2.

Figure 11:
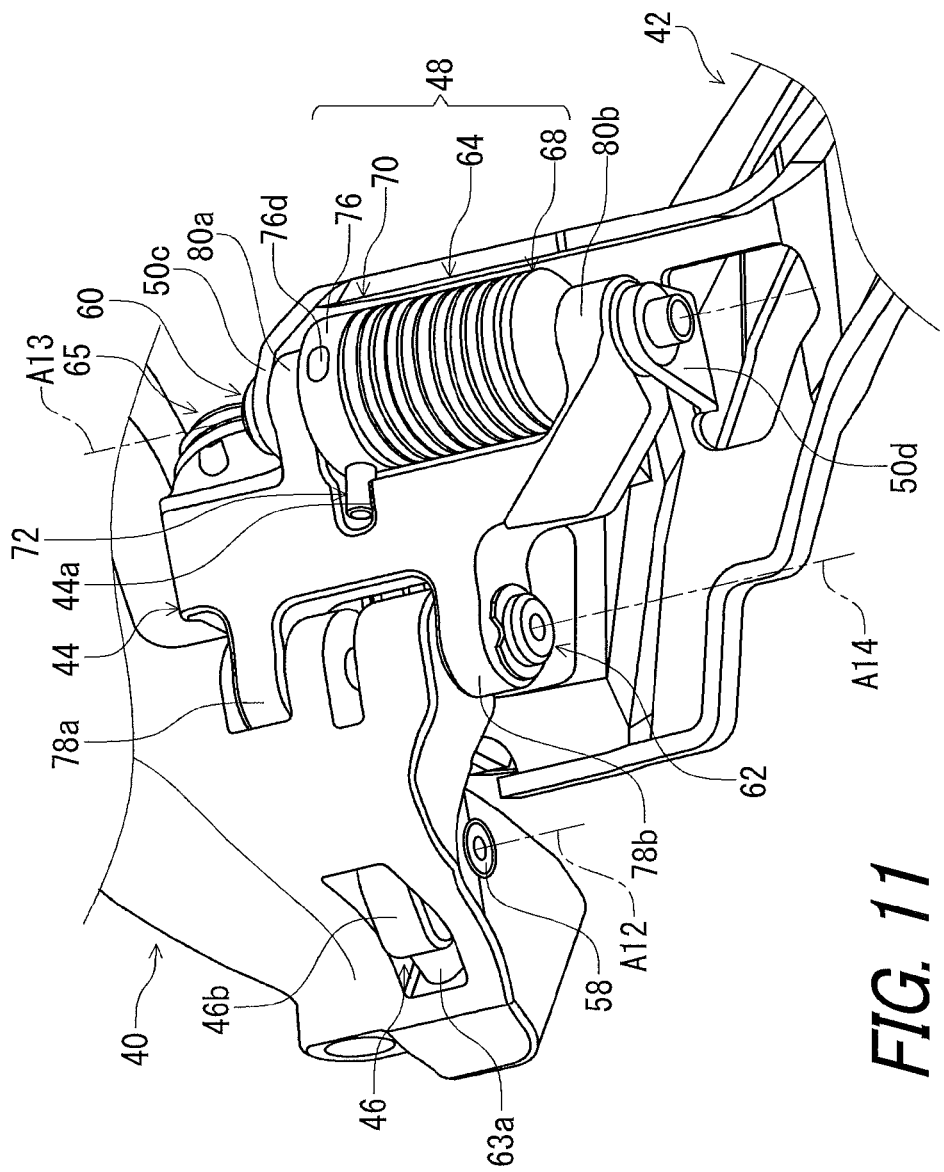
FIG. 11 is a partial perspective view of the derailleur illustrated in FIG. 6.

As illustrated in FIG. 11, the additional link member 44 includes proximal end portions 78a and 78b. The proximal end portions 78a and 78b are pivotally connected to the base member 40. The proximal end portions 78a and 78b are provided on an opposite side of the distal end portions 80a and 80b in the additional link member 44. The proximal end portion 78b is spaced apart from the proximal end portion 78a along the fourth rotation axis A14. Each of the proximal end portions 78a and 78b is pivotally connected to the base member 40 about the fourth rotation axis A14 by the second link shaft 62.

As illustrated in FIG. 11, the additional link member 44 includes a recessed portion 44a configured to engage with the second part 72. The second part 72 is provided in the recessed portion 44a. The recessed portion 44a is also configured to prevent the second part 72 from being unintentionally removed from the outer portion 76 of the first part 70. The biasing force of the biasing member 64 is transmitted from the first end portion 64b of the biasing member 64 to the additional link member 44 through the outside portion 76 and the second part 72.

Figure 12:
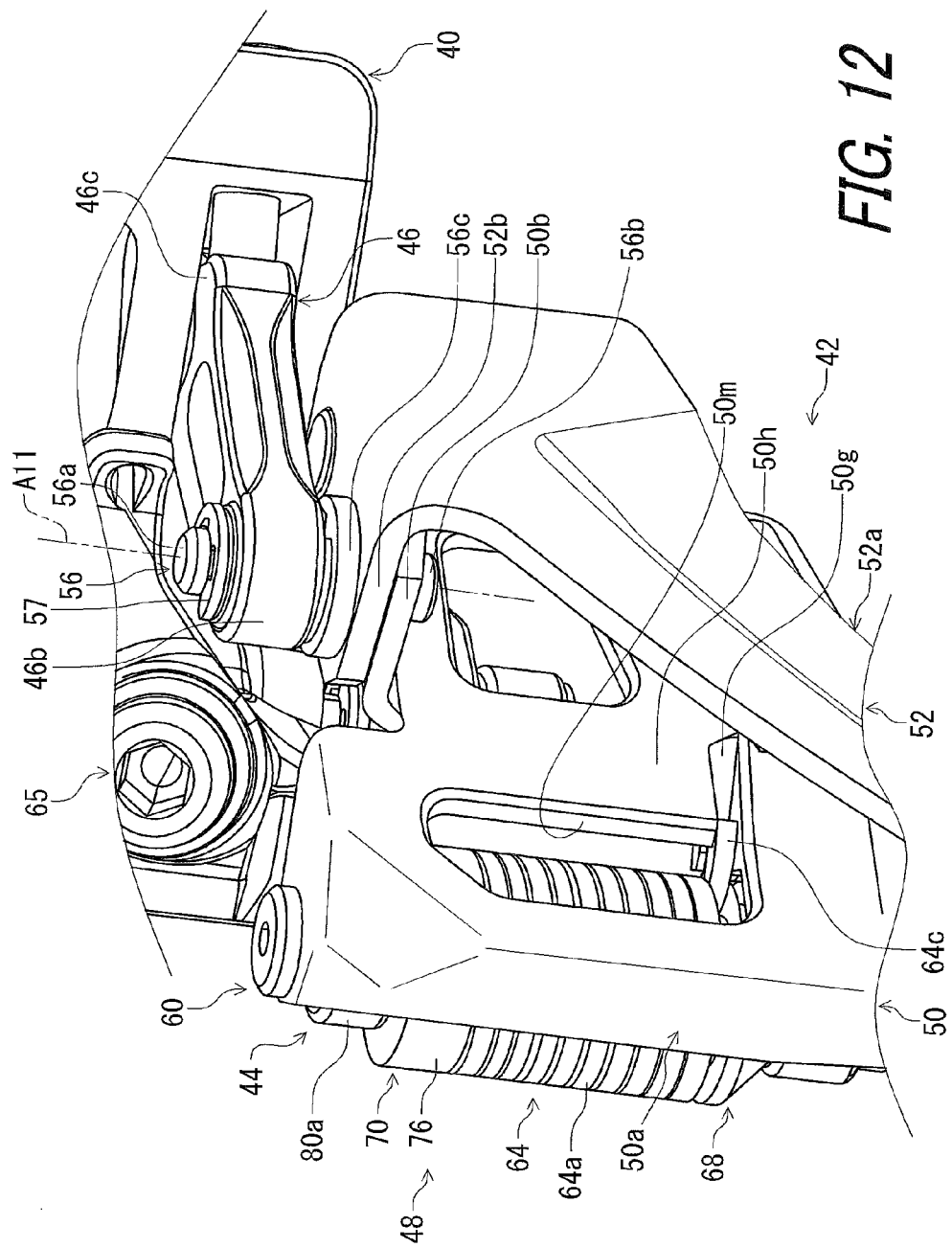
FIG. 12 is a partial perspective view of the derailleur illustrated in FIG. 6.

As illustrated in FIG. 12, the first member 50 of the chain guide 42 includes an opening 50m provided adjacent to the biasing mechanism 48. The first member 50 further includes an arrangement portion 50g configured to arrange the second end portion 64c and provided on a guiding surface 50h. The arrangement portion 50g comprises a recess in which the second end portion 64c is disposed. The guiding surface 50h is provided to slide with the chain 28 and faces the second guide portion 52a of the second member 52. The second end portion 64c of the biasing member 64 is configured to engage with the guiding surface 50h. More specifically, the second end portion 64c is provided inside the arrangement portion 50g and does not protrude from the guiding surface 50h toward the second guide portion 52a. This prevents the second end portion 64c from interfering with the chain 28. However, it will be apparent to those skilled in the bicycle field from the present disclosure that the arrangement portion 50g can be omitted if needed and/or desired. Since the second end portion 64c engages with the guiding surface 50h, the second end portion 64c and/or a support part engaging with the second end portion 64c do not protrude towards the bicycle frame 14 and/or the rear wheel 18. This makes the derailleur 12 compact in the transverse direction D2 of the bicycle frame 14, allowing a desired distance to be ensured between the derailleur 12 and the rear wheel 18 even if a size (e.g., a width) of the rear wheel 18 needs to be greater. Thus, the derailleur 12 can be prevented from interfering with the rear wheel 18 regardless of the size of the rear wheel 18.

Unlike the first end portion 64b of the biasing member 64, the biasing force of the biasing member 64 is directly transmitted from the second end portion 64c of the biasing member 64 to the first member 50 of the chain guide 42. However, it will be apparent to those skilled in the bicycle field from the present disclosure that the intermediate member 66 can be applied to the second end portion of the biasing member 64.

In such embodiment, the intermediate member 66 is provided at the lower end portion of the biasing member 64 instead of the support member 68, and the second part 72 is arranged at the arrangement portion 50g of the first member 50. Furthermore, the intermediate member 66 can be omitted if needed and/or desired. In such embodiment, the first end portion 64b of the biasing member 64 can directly engage with the additional link member 44 as well as the second end portion 64c of the biasing member 64.

Referring to FIGS. 13 to 16, the method of assembling the biasing mechanism 48 will be described below.

Figure 13:
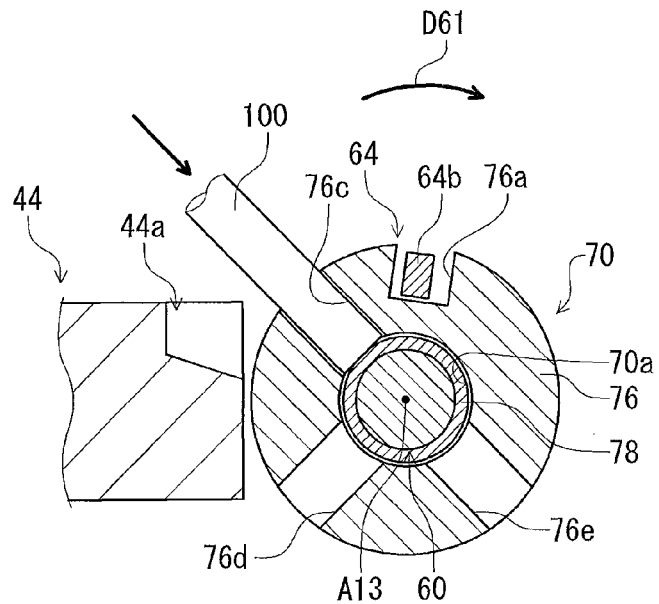
FIG. 13 is a schematic diagram illustrating the method of assembling the biasing mechanism of the derailleur illustrated in FIG. 6.

As illustrated in FIG. 13, the first end portion 64b of the biasing member 64 is provided in the engaging groove 76a of the outside portion 76 of the first part 70. In the state depicted in FIG. 11, the biasing member 64 is a free state, and the biasing force of the biasing member 64 is not applied to the outside portion 76. The initial circumferential position of the tool engaging opening 76c with respect to the additional link member 44 is set to a position at which the first tool 100 can be inserted into the tool engaging opening 76c, for example.

As illustrated in FIG. 13, a first tool 100 is inserted into the tool engaging opening 76c of the outside portion 76. The first part 70 is rotated in a first rotation direction D61 by the worker using the first tool 100, increasing the biasing force F1 of the biasing member 64. The first part 70 is held against the biasing force F1 by the worker using the first tool 100 at the circumferential position depicted in FIG. 14.

Figure 14:
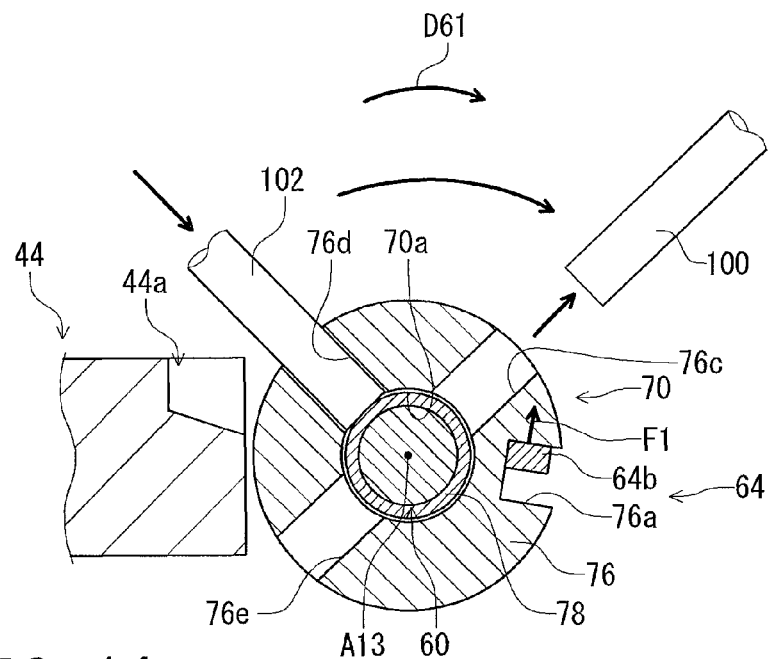
FIG. 14 is a schematic diagram illustrating the method of assembling the biasing mechanism of the derailleur illustrated in FIG. 6.

As illustrated in FIG. 14, when the tool engaging opening 76d is moved to a position at which a second tool 102 can be inserted into the tool engaging opening 76d, the second tool 102 is inserted into the tool engaging opening 76d. After the second tool 102 is inserted into the tool engaging opening 76d, the first tool 100 is removed from the tool engaging opening 76c. At this time, the first part 70 is held against the biasing force F1 by the worker using the second tool 102 at the circumferential position depicted in FIG. 14.

Figure 15:
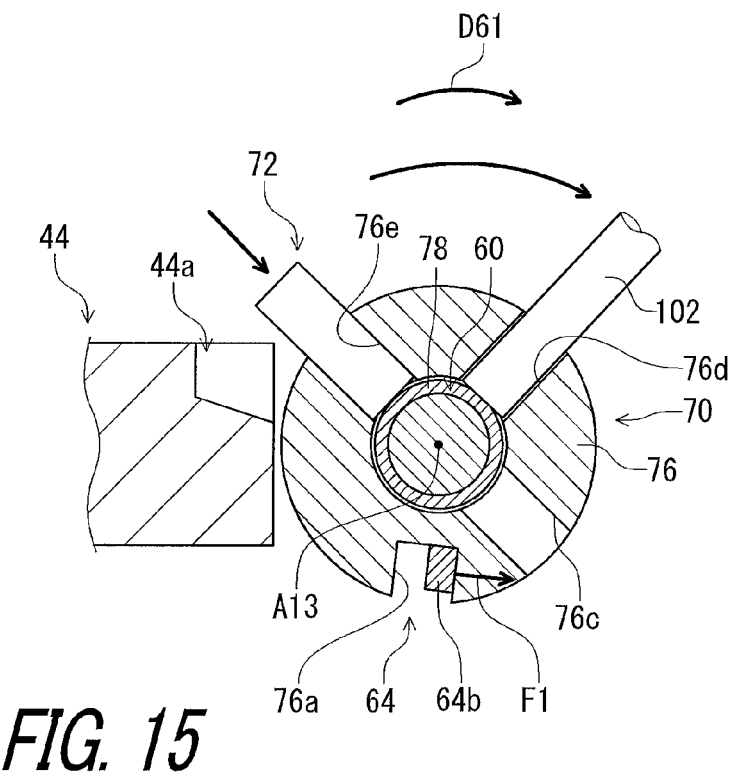
FIG. 15 is a schematic diagram illustrating the method of assembling the biasing mechanism of the derailleur illustrated in FIG. 6.

As illustrated in FIG. 15, the first part 70 is further rotated in the first rotation direction D61 by the worker using the second tool 102. When the pin engaging opening 76e is moved to a position at which the second part (pin) 72 can be inserted into the pin engaging opening 76e, the second part 72 is inserted into the pin engaging opening 76e.

Figure 16:
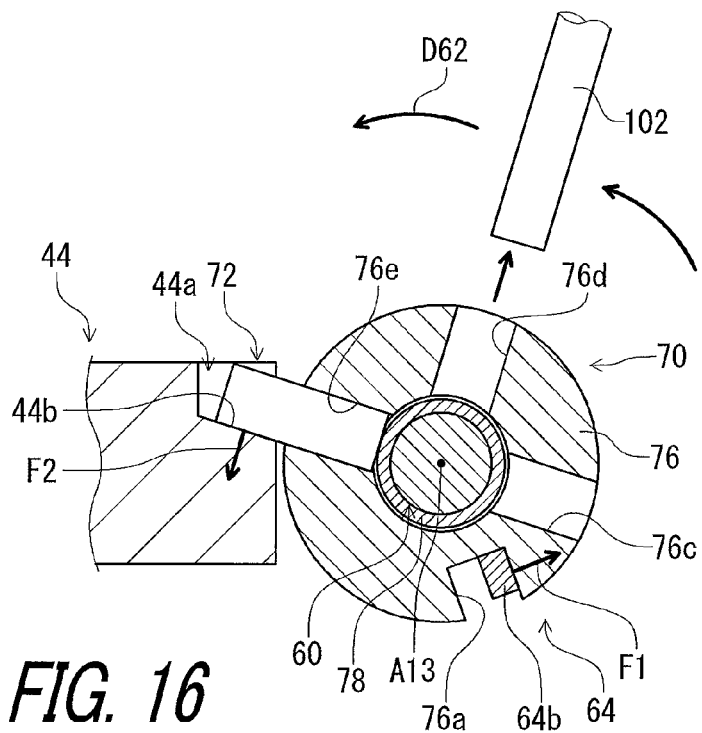
FIG. 16 is a schematic diagram illustrating the method of assembling the biasing mechanism of the derailleur illustrated in FIG. 6.

As illustrated in FIG. 16, the first part 70 is rotated in a second rotation direction D62 by the worker using the second tool 102, allowing the second part 72 to contact an inclined surface 44b of the recessed portion 44a. The second rotation direction D62 is opposite to the first rotation direction D61. In a state where the second part 72 contacts the inclined surface 44b, the second tool 102 is removed from the tool engaging opening 76d. The biasing force F2 is transmitted from the biasing member 64 to the additional link member 44 through the first part 70 and the second part 72 of the intermediate member 66.

As discussed above, the intermediate member 66 is separately provided from the chain guide 42 and the additional link member 44 so as to transmit the biasing force F2 of the biasing member 64 from the first end portion 64b to the additional link member 44 through the intermediate member 66. This allows the biasing mechanism 48 to be easily assembled using the first tool 100 and the second tool 102, comparing with a derailleur in which the intermediate member 66 is not provided.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" or "element" when used in the singular can have the dual meaning of a single part or a plurality of parts.

The ordinal numbers in the terms "first", "second" or the like recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A derailleur comprising:
   a base member configured to be attached to a bicycle frame;
   a chain guide comprising:
      a first member including a first guide portion and a first connecting portion, the first guide portion being contactable with a bicycle chain, the first connecting portion protruding from the first guide portion and being integrally provided with the first guide portion as a single unitary member, the first connecting portion being bent from the first guide portion; and
      a second member including a second guide portion and a second connecting portion, the second guide portion being contactable with the bicycle chain, the second connecting portion protruding from the second guide portion toward the first guide portion to overlap the first connecting portion, the second connecting portion being integrally provided with the second guide portion as a single unitary member, the second connecting portion being bent from the second guide portion;
   a link member configured to movably couple the chain guide to the base member; and
   a shaft member configured to couple the first connecting portion to the second connecting portion and configured to rotatably couple the chain guide to the link member.

2. The derailleur according to claim 1, wherein
   the chain guide is configured to be movable with respect to the base member between a retracted position and an extended position at which the chain guide is farther from the base member than the retracted position, and
   the shaft member is configured to move away from the base member in a forward direction of the bicycle frame when the chain guide moves from the retracted position to the extended position.

3. The derailleur according to claim 1, further comprising:
   an additional link member configured to couple the chain guide to the base member such that the base member, the chain guide, the link member, and the additional link member define a four-bar linkage.

4. The derailleur according to claim 3, wherein
   the additional link member includes a cable attachment portion to which an operation cable is to be attached.

5. The derailleur according to claim 4, wherein
the additional link member is arranged closer to the bicycle frame than the link member when the base member is attached to the bicycle frame.

6. The derailleur according to claim 1, wherein
the first connecting portion and the second connecting portion are provided at an upper end portion of the chain guide.

7. The derailleur according to claim 1, wherein
the first connecting portion includes a first through-hole,
the second connecting portion includes a second through-hole, and
the shaft member extends through the first through-hole and the second through-hole.

8. The derailleur according to claim 7, wherein
the shaft member includes a first flange, and
the first connecting portion and the second connecting portion are provided between the first flange and the link member.

9. The derailleur according to claim 1, further comprising:
an additional link member configured to rotatably couple the first member to the base member, wherein
the second connecting portion of the second member is provided between the link member and the first connecting portion of the first member.

10. The derailleur according to claim 1, wherein
the first connecting portion is configured to contact the second connecting portion.

11. The derailleur according to claim 1, wherein
the first connecting portion includes an upstream end portion and a downstream end portion,
the downstream end portion is disposed downstream of the upstream end portion in a chain driving direction, and
the shaft member is disposed closer to the upstream end portion than the downstream end portion in the chain driving direction in state where the base member is attached to the bicycle frame.

12. The derailleur according to claim 1, wherein
the second connecting portion is provided between the link member and the first connecting portion.

13. The derailleur according to claim 12, wherein
the first guide portion is closer to the bicycle frame than the second guide portion in a state where the base member is attached to the bicycle frame.

14. The derailleur according to claim 1, wherein
the first guide portion is spaced apart from the second guide portion in a transverse direction to define a chain guiding slot through which a bicycle chain is to extend,
the first guide portion is configured to shift the bicycle chain away from the bicycle frame in the transverse direction, and
the second guide portion is configured to shift the bicycle chain toward the bicycle frame in the transverse direction.

15. The derailleur according to claim 1, wherein
the shaft member is configured to rotatably couple the chain guide to the link member about a first rotational axis, and
the first connecting portion at least partially overlaps with the second connecting portion when viewed along the first rotational axis.

16. The derailleur according to claim 1, wherein
the first connecting portion is bent from an end part of the first guide portion, and
the second connecting portion is bent from an end part of the second guide portion.

17. A derailleur comprising:
a base member configured to be attached to a bicycle frame;
a chain guide comprising:
 a first member including a first connecting portion; and
 a second member including a second connecting portion to overlap the first connecting portion;
a link member configured to movably couple the chain guide to the base member; and
a shaft member configured to couple the first connecting portion to the second connecting portion and configured to rotatably couple the chain guide to the link member, wherein
the first connecting portion includes a first through-hole,
the second connecting portion includes a second through-hole,
the shaft member extends through the first through-hole and the second through-hole,
the shaft member includes a first flange,
the first connecting portion and the second connecting portion are provided between the first flange and the link member,
the link member includes a first link through-hole through which the shaft member extends,
the shaft member includes a second flange, and
the first connecting portion, the second connecting portion, and the link member are provided between the first flange and the second flange.

18. A derailleur comprising:
a base member configured to be attached to a bicycle frame;
a chain guide comprising:
 a first member including a first connecting portion; and
 a second member including a second connecting portion to overlap the first connecting portion;
a link member configured to movably couple the chain guide to the base member; and
a shaft member configured to couple the first connecting portion to the second connecting portion and configured to rotatably couple the chain guide to the link member, wherein
the first connecting portion includes a first through-hole,
the second connecting portion includes a second through-hole,
the shaft member extends through the first through-hole and the second through-hole,
the shaft member includes a first flange,
the first connecting portion and the second connecting portion are provided between the first flange and the link member,
the shaft member includes a second flange and a third flange,
the third flange is provided between the first flange and the second flange, and
the first connecting portion and the second connecting portion are provided between the first flange and the third flange.

19. The derailleur according to claim 18, wherein
the link member includes a first link through-hole through which the shaft member extends, and
the link member is provided between the third flange and the second flange.

* * * * *